Jan. 7, 1941. A. N. LAWRENCE 2,227,593
LIQUID CONTROL GEAR
Filed May 25, 1938

INVENTOR
ALFRED N. LAWRENCE
BY Joseph H. Lipschutz
ATTORNEY

Patented Jan. 7, 1941

2,227,593

UNITED STATES PATENT OFFICE 2,227,593

LIQUID CONTROL GEAR

Alfred N. Lawrence, New York, N. Y., assignor to Sperry Products, Inc., Brooklyn, N. Y., a corporation of New York Application May 25, 1938, Serial No. 209,873

5 Claims. (Cl. 60—54.5)

This invention relates to liquid control gear of the type wherein movement of a member at a transmitting station is caused to control movement of a member at a receiving station. More particularly, this invention relates to control gear of this type wherein the transmitting and receiving stations are connected by a liquid transmission system. One such system is shown in the patent to H. S. Hele-Shaw and T. E. Beacham, No. 1,983,884, granted December 11, 1934 in which the object is to apply a constant force to the fluid system at the transmitting end and to receive a corresponding constant force at the receiving end. Another such system is shown in my copending application Serial No. 156,630, filed July 31, 1937 (issued as Patent No. 2,197,554 on April 16, 1940) for Liquid control gear, in which the object consists in applying a constantly increasing force at the transmitting end to overcome a constantly increasing load at the operated or receiving end. In either of the aforementioned cases, the operating and operated members will retain any position into which they may be moved without any tendency on their part to return to a centralized position.

Particularly in the type of transmission system disclosed in my copending application, a problem arises due to the fact that the fluid in the transmission system changes its temperature, particularly at the receiving end, due to the operation of the mechanism at that end, and this causes the parts at the receiving end to be operated through a predetermined degree over and above the operation which has been transmitted thereto by the transmitting end. Thus, for instance, in my said copending application, the receiving end operates a variable pitch propeller mechanism under control of a governor and it has been found that temperature variation due to heating up of the fluid at the receiving end has caused variation in engine speed up to 200 R. P. M.

It is the principal object of my invention, therefore, to provide a transmission system wherein temperature variations will be compensated for in such manner as not to affect the operation of the mechanism at the receiving end.

Further objects and advantages of this invention will become apparent in the following detailed description thereof.

In the accompanying drawing.

Figure 1:
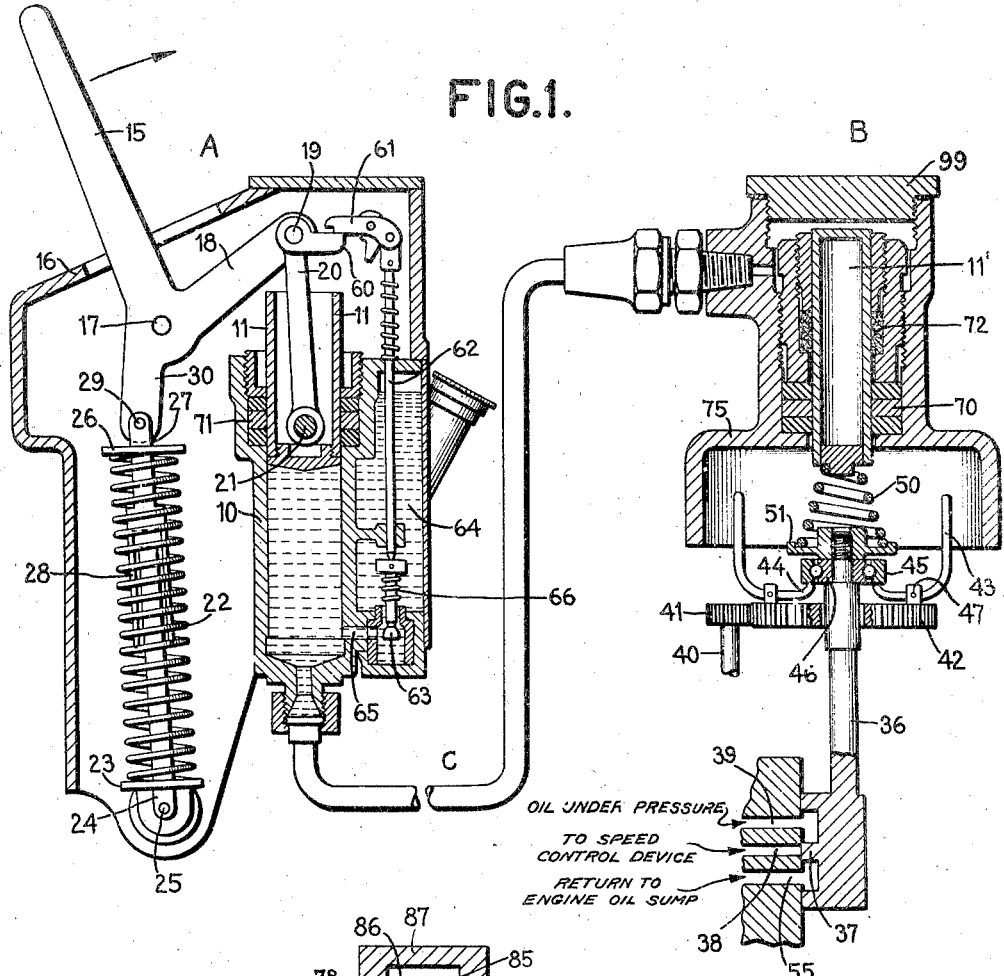
Fig. 1 is an assembly view, with parts sectioned vertically, of a liquid control gear embodying my invention.

I have illustrated my invention as applied to a transmission system adapted to control the pitch of an aircraft propeller as disclosed in my said copending application Serial No. 156,630, but it will be understood that the invention is capable of broad application wherever the principle applies.

Referring to the drawing, it will be seen that this invention comprises three main parts, namely, a transmitting station A, a receiving station B, and a force transferring means, such as a connecting duct C adapted to be filled with a liquid. It will be apparent that force applied at one end of the liquid column will cause said column to move through the duct C to operate a member at the other end of the liquid column. For applying forces to the liquid column for the purpose of transmitting forces, there may be provided a cylinder 10 within which operates a trunk type piston 11. Said cylinder is connected at one end to the duct C which is filled with liquid extending up to the said piston. For operating the said piston in a direction to transmit force to the liquid column, there may be provided a transmitting element in the form of an operating handle 15 pivoted in casing 16 at 17, said lever having a crank arm 18 pivotally connected at 19 to the upper end of a piston rod 20 pivotally connected to the piston at 21. As the handle is moved in the direction of the arrow, the piston is lowered to cause the column of liquid to move through the duct C. The force which is applied to the piston is determined by a loading spring 22 seated against a bracket 23 fixed upon a rod 24 pivoted at 25 within the casing 16. The other end of said loading spring bears against a bracket 26 fixed to a member 27 having a sleeve 28 within which rod 24 may slide, so that said spring is extensible. The member 27 is pivoted at 29 to a crank arm 30 integral with the crank arm 18 and handle 15. The position of the spring and its connections is such that the spring acts through a small lever arm to apply a very slight loading force to crank arm 18 and the piston 11 when the piston is in its uppermost position, but as the handle 15 is actuated in the direction of the arrow it will be seen that the spring acts through an increasing lever arm. At the same time, however, the spring is extended so that while it acts through a larger lever arm it applies a decreasing force as said arm increases. However, the design of the various parts is such that the rate of decrease of the compressive force of the spring is slower than the rate of increase of the lever arm as handle 15 is actuated in the direction of the arrow, so that the force applied to the piston 11, which is the product of these two factors, will increase at a constant rate to apply a constantly increasing loading force on the piston as it moves into its cylinder 10. The force which an operator applies to handle 15 is constant in spite of the increasing force on the piston, and is only sufficient to overcome friction in the system.

The invention is shown applied to a device for controlling a fly ball governor which in turn controls the pitch of the propeller blades of an airplane propeller in order to enable the airplane engine to operate at its maximum efficient speed. Thus, in the example shown in Fig. 1, if it is desired to vary the pitch of the propellers, handle 15 is operated in the direction of the arrow, which will cause an element at the receiver end, such as piston 11', to be moved out of its cylinder and carry therewith a valve stem 36. As said valve stem 36 is moved downwardly (in Fig. 1) valve 37 opens the port 38 to connect the same with a source 39 of oil under pressure. The said port 38 leads to a propeller pitch control device to cause the blades of said propeller to be changed in position in a direction to permit the engine to run at higher speed. As the engine speed picks up in response to the said change in pitch of the propeller, the valve stem 36 is caused to be moved upwardly to close port 38 and retain the propeller blades in the predetermined position. For this purpose, the engine may drive through shaft 40 and suitable gearing 41, 42 to operate a governor carried by the gear 42, one end 44 of each governor element being in engagement with a race 45 around a collar 46 fixed to the valve stem 36. As the speed of the engine picks up, the governor elements will rotate around their pivots 47 to lift the valve stem against the action of spring 50. Said spring at one end engages a disk 51 fixed to the valve member 36 and at the other end presses against the piston 11'. When the speed of the engine has picked up sufficiently to lift the valve stem 36 so as to close port 38, then the pressure which the spring 50 applies to piston 11' will be equal to the force transmitted to the other end of said piston 11' by the piston 11. If the speed of the engine exceeds the desired speed, then the valve stem 36 will be further lifted to uncover port 38 and connect the same with the return passage 55 to permit some of the oil to drain out and thus shift the propeller blades in the opposite direction to cut down the speed. When the engine speed is at the desired point the opposing force upon one side of said piston 11' will equal the transmitted force on the other side thereof.

Since in every liquid transmission system of the type described a certain amount of the liquid will leak past the pistons, and since the accuracy of operation of the system depends upon constancy of volume of liquid in the transmission system, means must be provided for periodically replenishing the fluid in the system to make good any loss or to permit withdrawal of an excess due to temperature expansion, etc. For this purpose, applicant has shown the system which is fully shown and described in the said patent to Hele-Shaw No. 1,983,884 and which consists of an arm 60 carried by the piston rod 20, designed, each time the operating lever is moved to its limiting position, to actuate trip mechanism 61 to lift a valve stem 62 to open a valve 63 to permit fluid from an auxiliary reservoir 64 to communicate with the fluid in the transmission system through a passage 65. If there is a deficiency of fluid in the transmission system, fluid will be supplied from reservoir 64. The valve 63 is normally maintained seated by means of a spring 66.

When there is variation of temperature which may affect the fluid in the transmission system, the liquid will tend to expand or contract and cause operation of valve 36 with consequent variation of engine speed above and below the speed originally set. Thus, in the device shown, the operation of the governor at end B causes the fluid in the system adjacent said end to be heated up and has been found to cause variations in engine speed of as high as 200 R. P. M. The problem therefore consists in devising a system whereby the variations in temperature of the fluid in the transmission system will not affect the operation of the parts controlled at the receiving end. Applicant has solved this problem in the following manner: The piston 11' is shown as operating past a packing 70 which is similar to a packing 71 past which piston 11 operates, and both packings are designed to apply substantially the same amount of frictional resistance to the movement of the respective pistons. In addition to packing 70, a second packing 72 is provided for the piston 11' but not for the piston 11, which means that substantially greater resistance is offered to the movement of piston 11' than to the movement of piston 11. The consequence of this construction is that if the transmission fluid heats up, the tendency of said fluid to operate the piston 11' to a new operated position and thus affect the operation of the pitch controlling mechanism will be counteracted because piston 11 moves more easily in response to the pressure in the system than does piston 11'. Therefore, any adjustment in position due to variations in temperature of the transmission fluid will affect the position of piston 11 but will not affect the position of piston 11' and hence will introduce no error in the operation of the operated device at the receiving end. The additional packing 72 may be of suitable material such as cork or rubber.

Figure 2:
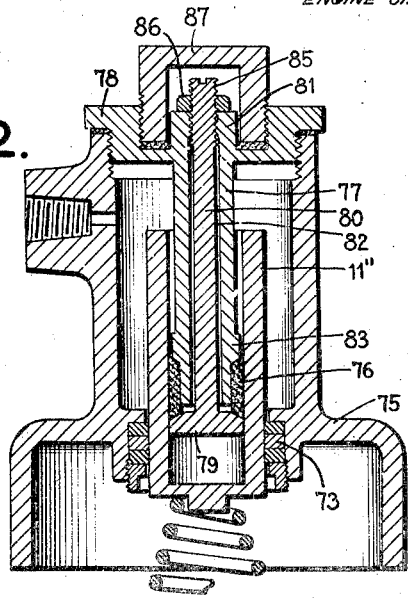
Fig. 2 is an enlarged vertical section of a portion of mechanism at the receiving end, showing a modified arrangement of that shown in Fig. 1.

In a modified form of my invention shown in Fig. 2, I have shown a different type of packing. In said form the piston 11' is inverted to take the form of piston 11'' which operates past an ordinary packing 73 between the piston and the casing 75. The fluid acts upon the upper edge of the piston which provides an area equal to that of the closed end of piston 11'. As the piston moves past packing 73 which engages the outside thereof, it also moves past an internal packing 76 which is in engagement with the inner surface thereof. Said packing 76 may be held in position by reason of the fact that it engages in an annular chamber formed between a fixed cylindrical member 77 depending from cap 78 screwed into the upper end of casing 75, and a flange 79 at the end of a stem 80 screw-threaded into the upper end 81 of hollow chamber 82 formed within the member 77. The member 77 is provided with a flange portion 83 which is adapted to engage the upper end of packing 76, while the flange 79 engages the lower member. It will now be seen that as flange 79 is drawn upwardly toward flange 83 by screw threading stem 80 upwardly through end 81 of cap 78, the packing 76 will be compressed outwardly into firm engagement with the inner wall of piston 11". The degree of pressure may thus be controlled at will. A lock nut 86 holds the threaded end 85 in position and a cap 87 screw-threaded into cap 78 and enclosing threaded end 85 may be provided to enclose the adjusting member after it has been set in adjusted position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to obtain by Letters Patent is:

1. A balanced remote control system comprising a transmitting station including a movable transmitter element, a receiving station including a movable receiver element, a force transferring connection between said stations whereby movement of said transmitter element moves said receiver element, means for applying a load to the transmitter element independent of the load applied by the operator, which is equal to the load on the receiver element in every position of said elements, means opposing the movements of said transmitter element, and means opposing the movements of said receiver element, said last-named means being adapted to offer resistance in excess of the resistance offered by said first-named means.

2. A remote control system comprising a transmitting station including a movable transmitter element, a receiving station including a movable receiver element, a force transferring connection between said stations whereby movement of said transmitter element moves said receiver element, frictional means opposing the movements of said transmitter element, and frictional means opposing the movements of said receiver element, said last named means being adapted to offer resistance in excess of the resistance offered by said first named means.

3. A balanced remote control system comprising a transmitting station including a movable transmitter element, a receiving station including a movable receiver element, a fluid force transferring connection between said stations whereby movement of said transmitter element moves said receiver element, said connection being responsive to temperature variations, means for applying a load to the transmitter element independent of the load applied by the operator, which is equal to the load on the receiver element in every position of said elements, means opposing the movements of said transmitter element, and means opposing the movements of said receiver element, said last named means being adapted to offer resistance in excess of the resistance offered by said first named means.

4. A remote control system comprising a transmitting station including a movable transmitter element, a receiving station including a movable receiver element, a fluid force transferring connection between said stations whereby movement of said transmitter element moves said receiver element, said connection being responsive to temperature variations, frictional means opposing the movements of said transmitter element, and frictional means opposing the movements of said receiver element, said last named means being adapted to offer resistance in excess of the resistance offered by said first named means.

5. A remote control system comprising a transmitting station including a cylinder and a piston movable therein, a receiving station including a cylinder and a piston movable therein, a fluid force transferring connection between said cylinders whereby movement of the piston at the transmitting station moves said piston at the receiving station, said connection being responsive to temperature variations, and means producing frictional resistance between each piston and its respective cylinder, the friction producing means between the piston and cylinder at the receiving station being adapted to offer greater resistance to movement of said piston than the friction producing means between the piston and cylinder at the transmitting station.

ALFRED N. LAWRENCE.